3,439,036
ADAMANTANE DERIVATIVES OF
2,2-DIPHENYLACETAMIDES
Jack Bernstein, New Brunswick, N.J., assignor to Olin Mathieson Chemical Corporation, New York, N.Y., a corporation of Virginia
No Drawing. Filed July 26, 1965, Ser. No. 474,966
Int. Cl. C07c 103/20, 103/44, 103/42
U.S. Cl. 260—559      10 Claims

ABSTRACT OF THE DISCLOSURE

This invention relates to new compounds of the general formula

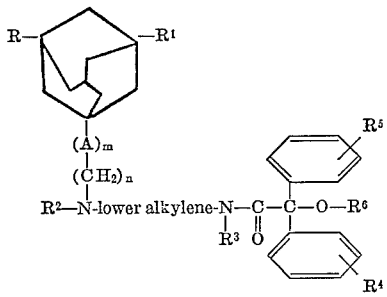

and to acid addition salts and quaternary salts thereof, compounds which are useful for the alleviation of pain.

---

This invention relates to new chemical compounds. More particularly, the invention relates to new compounds having the structural formula (I)

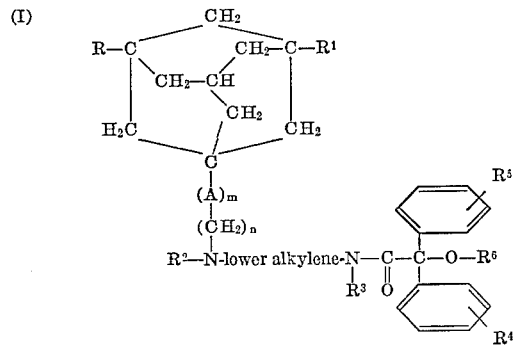

and to acid addition and quaternary ammonium salts thereof.

The symbols in Formula I have the following meanings: R, $R^1$, $R^4$ and $R^5$ each represents hydrogen, halo, lower alkyl, phenyl and lower alkoxy; $R^2$, $R^3$ and $R^6$ each represents lower alkyl and lower alkenyl; A represents methylene ($CH_2$), hydroxymethylene (CHOH) and carbonyl (C=O); $m$ is 0 or 1; and $n$ is 0 to 7, with the proviso that when A is hydroxymethylene or carbonyl, $n$ is not zero.

The lower alkyl and lower alkenyl groups represented by the symbols in Formula I include straight and branched chain aliphatic hydrocarbon radicals, e.g., methyl, ethyl, propyl, isopropyl, butyl, isobutyl, t-butyl, amyl, vinyl, propenyl, isopropenyl, butenyl and the like. The lower alkylene groups are divalent aliphatic hydrocarbon radicals of the same character. Similarly, the lower alkoxy groups are aliphatic ether groups having such alkyl groups attached to the oxygen atom, e.g., methoxy, ethoxy, propoxy, isopropoxy and the like. All four of the halogens are included, but chloro and bromo are preferred.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate or the like.

The compounds of this invention are therapeutically active substances which possess analgesic activity. They are useful for the alleviation of pain. They may be administered orally or parenterally in the form of tablets, capsules, elixirs, injectables or the like by incorporating the appropriate dosage (e.g., about 10 to 250 mg.) of the base of Formula I or a physiologically acceptable acid addition salt or quaternary ammonium salt thereof in a conventional vehicle according to accepted pharmaceutical practice.

The new compounds of this invention can be prepared by a variety of methods. One method involves the reaction of an α-halodiphenylacetyl halide with a diamine of the formula (II)                $R^2$ (3—R—5—$R^1$—1-adamantyl)-(A)$_m$—(C$H_2$)$_n$—N-lower alkylene-NH$R^3$ wherein the symbols have the same meaning as in Formula I, and treating the resultant intermediate with an alkanol or alkoxide of the formula (III)          lower alkyl—O—$R^7$ wherein $R^7$ is hydrogen or alkali metal.

Alternatively, an α-alkoxy - N - alkyl - N - (alkylaminoalkyl)-diphenylacetamide is reacted with a halide of the formula (IV)  (3—R—5—$R^1$—1 - adamantyl)—A—$CH_2$ - hal wherein A has the same meaning as in Formula I and hal represents a halogen.

The starting materials of Formulas II and IV may be obtained from the following acids: 1-adamantane carboxylic acid, 3-methyl - 1 - adamantanecarboxylic acid, 3-phenyl-1-adamantanecarboxylic acid, 3-methoxy-1-adamantanecarboxylic acid, 3-fluoro-, 3-chloro-, 3-bromo- and 3-iodo-1-adamantanecarboxylic acid, 3,5-dimethyl-1-adamantanecarboxylic acid and the like.

The starting materials of Formula II wherein $m$ is 0 may be obtained from an adamantanamine by treatment with ethylene oxide and converting the adamantylaminoethanol thus obtained to the corresponding chloride and reacting this chloride with a primary amine such as methyl amine or allyl amine. Alternatively, the adamantanamine may be acylated with a haloacyl halide and the amide so obtained reduced to the adamantanylamino alkyl halide for subsequent reaction with a primary amine.

The starting materials of Formula II wherein A is carbonyl may be obtained by converting an adamantanecarboxylic acid to the corresponding adamantyl alkyl ketone and halogenating to yield the corresponding adamantyl haloalkyl ketone.

Products in which A is CHOH are obtained by catalytic reduction of the corresponding carbonyl compounds.

The following examples are illustrative of the invention. All temperatures are on the centigrade scale.

EXAMPLE 1

Preparation of N-[2-(N-methyl-1-adamantylamino)ethyl]-N-methyl-2-ethoxy-2,2-diphenylacetamide, hydrochloride (a) Preparation of 2-(N-methyl-1-adamantylamino)ethanol.—A 140 ml. stainless steel bomb is charged with 16.5 grams of N-methyl-1-adamantylamine, 5.0 grams of ethylene oxide and 50 ml. of aqueous tetrahydrofuran and heated at 70° for twelve hours. The solvent is removed by distillation and the residue is fractionally distilled to yield the desired 2-(N-methyl-1-adamantylamino)ethanol.

(b) Preparation of N-(2-chloroethyl)-N-methyl-1-adamantylamine hydrochloride.—To a solution of 127 grams of 2-(N-methyl-1-adamantylamino)ethanol in 300 ml. of chloroform there is added dropwise, with vigorous stirring, 90 ml. of thionyl chloride, while the temperature of the reaction mixture is maintained at 20–25°. The mixture is then refluxed for two hours and a portion of the solvent is removed by distillation. The residue is cooled and diluted with anhydrous ether to give, as a colorless crystalline solid, N-(2-chloroethyl)-N-methyl-1-adamantylamine hydrochloride.

(c) Preparation of N,N'-dimethyl-N-(1-adamantyl)ethylenediamine.—To 300 grams of a cold 40% aqueous monomethylamine solution there is added 160 grams of N-(2-chloroethyl)-N-methyl-1-adamantylamine hydrochloride and 100 ml. of ethanol. The reaction mixture is stirred one hour at room temperature and then four hours at 80°. The reaction mixture is cooled and 100 grams of solid sodium hydroxide added. The temperature is kept below 30° during this addition by external cooling. The mixture is then extracted with ether, and the combined ether extracts dried over anhydrous potassium carbonate. The ether is then removed by distillation and the residue fractionally distilled to yield the desired N,N'-dimethyl-N-(1-adamantyl)ethylenediamine.

(d) Preparation of N-[2-(N-methyl-1-adamantylamino)ethyl]-N-methyl-2-ethoxy-2,2-diphenylacetamide, hydrochloride.—A solution of 26.5 grams of α-chlorodiphenylacetyl chloride in 200 ml. of benzene is maintained at 20–25° during the dropwise addition of a solution of 22.2 grams of N,N'-dimethyl-N-(1-adamantyl)-ethylenediamine in 100 ml. of benzene. The reaction mixture is stirred for one hour after the addition is completed and is then refluxed for two hours. The solvent (200 ml.) is then removed by distillation with the concurrent addition of absolute ethanol. Two hundred ml. of absolute ethanol are then added and the reaction mixture refluxed for an additional eight hours. The solvent is then removed by distillation and the cooled residue poured into cold water. The resulting solution is made alkaline by the addition of aqueous sodium hydroxide and the mixture extracted with ether. The combined ether extracts are dried over anhydrous magnesium sulfate and the ether removed by distillation. The residue is fractionally distilled under reduced pressure to yield the desired N-[2-(N-methyl-1-adamantylamino)ethyl]-N-methyl-2-ethoxy-2,2-diphenylacetamide.

A solution of this base in anhydrous ethanol is treated with an equivalent of ethanolic hydrogen chloride and the mixture diluted with anhydrous ether. The precipitated hydrochloride is filtered and may be recrystallized from a mixture of ethanol and ether.

Similarly by replacing the absolute ethanol in part (c) of Example 1, with the alcohol indicated below, the corresponding N-[2-(N-methyl-1-adamantylamino)ethyl]-N-methyl-2-alkoxy-2,2-diphenylacetamide, hydrochloride is obtained.

| Example | Alcohol | 2-alkoxy group |
| --- | --- | --- |
| 2 | Methanol | 2-methoxy. |
| 3 | 2-propanol | 2-isopropoxy. |
| 4 | n-Butanol | 2-n-butoxy. |
| 5 | Isobutanol | 2-isobutoxy. |
| 6 | Allyl | 2-allyloxy. |

EXAMPLE 7

Preparation of 2-ethoxy-N-methyl-N-[2-[N-methyl-N-[2-(1-adamantyl)-2-oxoethyl]amino]ethyl]-2,2-diphenylacetamide, hydrochloride A mixture of 12 grams of 2-ethoxy-N-methyl-N-(2-methylaminoethyl)-2,2-diphenylacetamide, hydrochloride and 5 grams of 1-adamantylbromomethyl ketone in 250 ml. of anhydrous xylene are stirred at room temperature for 15 minutes and then warmed on a steam bath for an additional 15 minutes. The reaction mixture is cooled and filtered to remove the hydrobromide salt of the starting 2-ethoxy-N-methyl-N-(2-methylaminoethyl)-2,2-diphenylacetamide. The filtrate is treated with an excess of alcoholic hydrogen chloride to give a precipitate, which is filtered and washed with anhydrous ether. The 2-ethoxy-N-methyl-N-[2-[N-methyl-N-[2-(1-adamantyl)-2-oxoethyl]amino]ethyl]-2,2-diphenylacetamide, hydrochloride may be recrystallized from a mixture of ethanol and ether.

EXAMPLE 8

Preparation of N-[3-N methyl-1-adamantylamino)propyl]-N-methyl-2-ethoxy-2,2-diphenylacetamide, hydrochloride (a) Preparation of N-(1-adamantyl)-3-chloro-N-methylpropionamide.—With ice-cooling and stirring, 37.1 grams of β-chloropropionyl chloride in 100 ml. of anhydrous benzene is added dropwise to 100 grams of 1-(methylamino)adamantane in 200 ml. of anhydrous benzene. The reaction mixture is then refluxed for five hours, filtered and the filtrate washed with water and dried over anhydrous magnesium sulfate. The ether is removed by distillation and the N-(1-adamantyl)-3-chloro-N-methylpropionamide thus obtained may be used without further purification. If desired, the product may be purified by fractional distillation.

(b) Preparation of N-(3-chloropropyl)-N-methyl-1-adamantanamine.—To 3.8 grams of lithium aluminum hydride in 200 ml. of anhydrous ether is added dropwise a solution of 25 grams of N-(1-adamantyl)-3-chloro-N-methylpropionamide in 400 ml. of anhydrous ether. The mixture is then refluxed for one hour, cooled in ice, treated with 2.5 ml. of water and then 2.5 ml. of 20% aqueous sodium hydroxide. The mixture is filtered and dried over anhydrous potassium carbonate. The ether is removed by distillation and the residue is fractionally distilled under reduced pressure to yield the desired N-(3-chloropropyl)-N-methyl-1-adamantanmaine.

(c) Preparation of N-[3-(N-methyl-1-adamantantylamino)propyl]-N-methyl-2-ethoxy-2,2-diphenylacetamide, hydrochloride.—Following the procedure of Example 1 but substituting an equivalent amount of N-(3-chloropropyl)-N-methyl-1-adamantanamine for the N-(2-chloroethyl)-N-methyl-1-adamantanamine in part (c), and an equivalent amount of the N,N'-dimethyl-N-(1-adamantyl)trimethylenediamine thus obtained for the N,N'-dimethyl-N-(1-adamantyl)ethylenediamine in part (d), there is obtained N-[3-(N-methyl-1-adamantylamino)propyl]-N - methyl-2 - ethoxy - 2,2 - diphenylacetamide, hydrochloride.

EXAMPLE 9

Preparation of 2 - ethoxy - N [2-[[(3-methoxy-1-adamantyl)methyl] - methylamino]ethyl] - N-methyl-2,2-diphenylacetamide, hydrochloride.

(a) Preparation of N - methyl-3-methoxy - 1 - adamantanecarboxamide.—A mixture of 10 grams of 3-methoxy-1-adamantanecarboxylic acid and 20 ml. of thionyl chloride are heated under reflux for thirty minutes. The excess thionyl chloride is removed by distillation under reduced pressure, 10 ml. of anhydrous benzene is added and the benzene removed by distillation under reduced pressure. The cooled residue is treated with a solution of methylamine in benzene. After several hours the precipitated solid is removed by filtration, and the filtrate concentrated under reduced pressure to yield N-methyl-3-methoxy-1-adamantanecarboxamide.

(b) Preparation of N-(3-methoxy-1-adamantylmethyl)-methylamine.—A solution of 10 grams of N-methyl-3-methoxy-1-adamantanecarboxamide in anhydrous ether is added slowly to a suspension of lithium aluminum hydride in anhydrous ether. After the addition is completed, the reaction mixture is heated to gentle reflux for four hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous magnesium sulfate and concentrated under reduced pressure to yield the N(3-methoxy-1-adamantylmethyl)-methylamine.

(c) Preparation of 2 - ethoxy-N - [2 - [[(3-methoxy-1-adamantyl)methyl]-methylamino]ethyl]-N - methyl - 2,2-diphenylacetamide, hydrochloride.—Following the procedure of Example 1, but substituting an equivalent quantity of N - (3 - methoxy-1-adamantylmethyl)methylamine for the N-methyl-1-adamantylamine in part (a), there is obtained 2 - ethoxy - N - [2-[[3-methoxy-1-adamantyl)-methyl]-methylamino]ethyl]-N-methyl-2,2 - diphenylacetamide, hydrochloride.

Similarly by replacing the 3-methoxy-1-adamantanecarboxylic acid with an equivalent amount of 3-phenyl-1-adamantanecarboxylic acid in part (a) there is obtained 2-ethoxy-N-methyl-N-[2-[N - [(3 - phenyl-1-adamantyl)-methyl]-N-methylamino]ethyl-2,2-diphenylacetamide, hydrochloride. Replacement with 2-ethoxy-N-methyl-N-[2-[N-[(3-bromo-1-adamantyl)methyl] - N - methylamino]-ethyl]-2,2-diphenylacetamide, hydrochloride. Replacement of the 3-methoxy-1-adamantanecarboxylic acid with 2-ethoxy-N-methyl-N-[2-[N-[(3,5 - dimethyl-1-adamantyl)-methyl[-N-methylamino]ethyl]2,2-diphenylacetamide, hy-hydrochloride. Replacement of the 3-methoxy-1,2-ethoxy-N-methyl-N-[2-[N-[2-(1-adamantyl)ethyl] - N - methylamino]ethyl]-2,2-diphenylacetamide, hydrochloride.

EXAMPLE 10

Preparation of 2-ethoxy-N - [2 - [[(3-methoxy-1-adamantyl)methyl]-methylamino]ethyl - N - methyl - 2,2,diphenylacetamide, hydrochloride.

(a) preparation of 1-ethylamino - 3 - methyladamantane.—A mixture of 60 grams of N-ethylacetamide, 45 grams of 1-bromo-3-methyladamantane and 60 grams of silver sulfate is heated at 100° for one hour. The cooled mixture is treated with 100 ml. of water and extracted with ether. The ether extracts are combined, dried over anhydrous magnesium sulfate and concentrated under reduced pressure to yield 1 - (N - ethyl - 3 - acetamido)-3-methyladamantane.

A mixture of 12 grams of 1-(N-ethylacetamido)-3-methyladamantane, 12 grams of sodium hydroxide antd 120 ml. of diethylene glycol is refluxed for five hours. The cooled mixture is poured into 1 liter of water and extracted with ether. The combined ether extracts are dried over anhydrous potassium carbonate and the ether then removed by distillation to yield the 1-ethylamino-3-methyladamantane.

(b) Preparation of 2-ethoxy-N-methyl-N-[2-[N-[3-(1-mantylamino)ethyl]-N-methyl-2-ethoxy - 2,2 - diphenylacetamide, hydrochloride.—Following the procedure of Example 1, but substituting an equivalent amount of 1-ethylamino-3-methyladamantane for the N-methyl-1-adamantylamine in part (a) there is obtained N-[2-(N-ethyl-3-methyl-1-adamantylamino)ethyl] - N - methyl-2-ethoxy-2,2-diphenylacetamide, hydrochloride.

EXAMPLE 11

Preparation of 2-ethoxy - N - methyl-N-[2-[N-[3-(1-adamantyl)-3-oxopropyl] - N - methylamino]ethyl]-2,2-diphenylacetamide, hydrochloride.

(a) Preparation of 1-adamantyl-$\beta$-chloroethylketone.—To a mixture of 15 grams of 1-adamantyl methyl ketone and 8 grams of chloromethyl methyl ether there is added 2.5 grams of boron trifluoride etherate and the mixture heated in pressure bottle at 60–65° for 10 hours. The cooled reaction mixture is poured into a mixture of ice and water and extracted several times with ether. The combined ether layers are washed thoroughly with water, dried over anhydrous magnesium sulfate and concentrated. The residue is distilled under reduced pressure to yield the desired 1-adamantyl-$\beta$-chloroethyl ketone.

(b) Preparation of 2-ethoxy-N-methyl-N-[2-[N-[3-(1-adamantyl)-3-oxopropyl] - N-methylamino]ethyl]2,2 - diphenylacetamide, hydrochloride.—Following the procedure of Example 7 but substituting an equilavent amount of 1-adamantyl $\beta$-chloroethyl ketone for the 1-adamantyl bromomethyl ketone there is obtained 2-ethoxy-N-methyl-N-[2-[N-[3 - (1 - adamantyl) - 3 - oxopropyl]-N-methylamino]ethyl]-2,2-diphenylacetamide, hydrochloride.

EXAMPLE 12

Preparation of 2-ethoxy-N-methyl-N-[2-[N-[3-(1-adamantyl)-3-hydroxypropyl] - N-methylamino]ethyl] - 2,2-diphenylacetamide, hydrochloride.

A solution of 2-ethoxy-N-methyl-N-[2-[N-3-(1-adamantyl)-3-oxopropyl] - N - methylamino]ethyl] - 2,2 - diphenylacetamide, hydrochloride in warm ethanol is shaken in a Parr hydrogenator apparatus under an initial pressure of 50 p.s.i. in the presence of 5 grams of 5% palladium on carbon until the theoretical quantity of hydrogen is absorbed. The mixture is filtered and the filtrate concentrated under reduced pressure. The residue is triturated with ether and filtered to yield the desired 2-ethoxy-N-methyl-N-[2-[N-[3-(1-adamantyl) - 3-hydroxypropyl]-N-methylamino]ethyl]-2,2-diphenylacetamide, hydrochloride. The salt may be purified by crystallization from a mixture of acetonitrile and anhydrous ether.

EXAMPLE 13

Preparation of N-[2-(N-methyl-1 - adamantylamino)ethyl]-N-methyl-2-ethoxy-2,2-di-o - tolylacetamide, hydrochloride (a) Preparation of 2-chloro-2,2-di-o-tolylacetyl chloride.—To a mixture of 10.5 grams of 2,2-di-o-tolylglycolic acid and 15 ml. of chloroform there is added, portionwise, 22 grams of phosphorous pentachloride. After the initial reaction has subsided the reaction mixture is heated on a steam bath for 30 minutes. The mixture is then concentrated under reduced pressure and the cooled residue extracted with anhydrous ether. The ether is removed under reduced pressure to yield the desired 2-chloro-2,2-di-o-tolyl acetyl chloride.

(b) Preparation of N-[2-(N-methyl-1-adamantylamino)ethyl]-N-methyl-2-ethoxy-2,2-di-o-tolylacetamide, hydrochloride.—Following the procedure of Example 1 (d) but substituting an equivalent amount of 2-chloro-2,2-di-o-tolylacetyl chloride for the α-chlorodiphenylacetyl chloride there is obtained N-[2-(N-methyl-1-adamantylamino)ethyl]-N-methyl-2-ethoxy-2,2-di-o - tolylacetamide hydrochloride.

Similarly by replacing the 2,2′-di-o-tolylglycolic acid (2,2′-dimethyl benzilic acid) with the following substituted benzilic acids there is obtained the corresponding substituted N-[2-(N-methyl-1-adamantylamino)ethyl]-N-methyl-2-ethoxy-2-$R^4$-substituted phenyl-2-$R^5$ - substituted phenylacetamide hydrochloride.

| Ex. | Reactant | $R^4$ | $R^5$ |
|---|---|---|---|
| 14 | 4-butoxybenzilic acid | Hydrogen | 4-butoxy. |
| 15 | 4-chlorobenzilic acid | do | 4-chloro. |
| 16 | 4-ethoxybenzilic acid | do | 4-ethoxy. |
| 17 | 4-methoxybenzilic acid | do | 4-methoxy. |
| 18 | 4-methylbenzilic acid | do | 4-methyl. |
| 19 | 2,2′-dichlorobenzilic acid | 2-chloro | 2-chloro. |
| 20 | 4,4′-difluorobenzilic acid | 4-fluoro | 4-fluoro. |
| 21 | 4,4′-diisopropylbenzilic acid | 4-isopropyl | 4-isopropyl. |
| 22 | 4,4′-dimethoxybenzilic acid | 4-methoxy | 4-methoxy. |
| 23 | 4-phenylbenzilic acid | Hydrogen | 4-phenyl. |
| 24 | 3,3′-dimethoxybenzilic acid | 3-methoxy | 3-methoxy. |

The foregoing examples are illustrative of compounds of this invention having various substituent groups indicated by the variables in Formula I. Other members may be similarly produced by utilizing starting materials having other substituents as indicated.

What is claimed is:

1. A member selected from the group consisting of a compound[s] of the formula

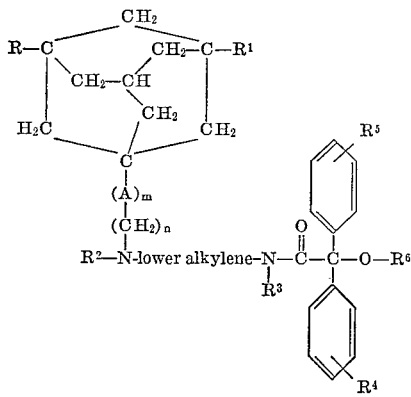

wherein R is a member of the group consisting of hydrogen and lower alkyl, $R^1$ is a member of the group consisting of hydrogen, lower alkyl, lower alkoxy and phenyl with the proviso that R and $R^1$ are the same, $R^4$ and $R^5$ each is a member of the group consisting of hydrogen, halo, lower alkyl, lower alkoxy and phenyl; $R^2$, $R^3$ and $R^6$ each is a member of the group consisting of lower alkyl and lower alkenyl; A is a member of the group consisting of methylene, hydroxymethylene and carbonyl, m is a member of the group consisting of 0 and 1; and n is an integer from 0 to 2, with the provisos that when A is other than methylene, n is other than zero, and when A is methylene, n is other than two, and an acid addition and quaternary ammonium salt thereof.

2. Acid-addition salt of a compound of claim 1.
3. A compound of the formula

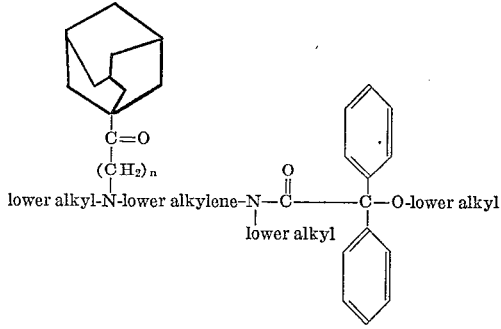

wherein n is an integer from 1 to 2.

4. A compound of the formula

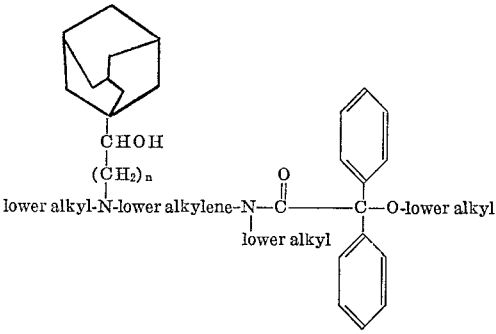

wherein n is an integer from 1 to 2.

5. N-[2 - (N - methyl - 1 - adamantylamino)ethyl] - N-methyl-2-ethoxy-2,2-diphenylacetamide.

6. Hydrohalide of the compound of claim 5.

7. 2-ethoxy-N-methyl-N-[2-[N-methyl-N - 2 - (1 - adamantyl)-[2 - oxoethyl]amino]ethyl] - 2,2 - diphenylacetamide.

8. 2-ethoxy-N-methyl-N-[2-[N-[(3 - methoxy - 1 - adamantyl)methyl]-N - methylamino]ethyl] - 2,2 - diphenylacetamide.

9. 2-ethoxy-N-methyl-N-[2-[N-[3-(1 - adamantyl) - 3-oxopropyl]-N - methylamino]ethyl] - 2,2 - diphenylacetamide.

10. 2-[ethoxy-N-[2-[[(3-methoxy-1 - adamantyl)methyl]-methylamino]ethyl]-N-methyl-2,2-diphenylacetamide.

References Cited

UNITED STATES PATENTS 3,297,746   1/1967   Jacobson et al _____ 260—559

HENRY R. JILES, *Primary Examiner.*

HARRY I. MOATZ, *Assistant Examiner.*

U.S. Cl. X.R.

260—570.5, 583, 586, 590, 617, 623, 514, 515, 561, 544, 999

PO-1050
(5/69)

UNITED STATES PATENT OFFICE
CERTIFICATE OF CORRECTION

Patent No. 3,439,036           Dated April 15, 1969

Inventor(s)   Jack Bernstein

It is certified that error appears in the above-identified patent and that said Letters Patent are hereby corrected as shown below:

Column 2, line 60, there should be a space as follows: Formula I.  Column 5, lines 51 to 64 should read -- Similarly by replacing the 3-methoxy-1-adamantanecarboxylic acid with an equivalent amount of 3-phenyl-1-adamantanecarboxylic acid in part(a) there is obtained 2-ethoxy-N-methyl-N-[2-[N-[(3-phenyl-1-adamantyl)methyl]-N-methylamino]ethyl-2,2-diphenyl acetamide, hydrochloride.  Replacement with 3-bromo-1-adamantanecarboxylic acid yields the corresponding 2-ethoxy-N-methyl-N-[2-[N-[(3-bromo-1-adamantyl)methyl]-N-methylamino]-ethyl]-2,2-diphenylacetamide, hydrochloride.  Replacement of the 3-methoxy-1-adamantanecarboxylic acid with 3,5-dimethyl-1-adamantanecarboxylic acid yields 2-ethoxy-N-methyl-N-[2-[N-[(3,5-dimethyl-1-adamantyl)methyl]-N-methylamino]ethyl]-2,2-diphenylacetamide, hydrochloride.  Replacement of the 3-methoxy-1-adamantanecarboxylic acid with 1-adamantaneacetic acid yields 2-ethoxy-N-methyl-N-[2-[N-[2-(1-adamantyl)ethyl]-N-methylamino]-ethyl]-2,2-diphenylacetamide, hydrochloride.--.  Column 5, the title of Example 10 should read -- Preparation of N-[2-(N-ethyl-3-methyl-1-adamantylamino)ethyl]-N-methyl-2-ethoxy-2,2-diphenylacetamide, hydrochloride --.  Column 5, line 70 there should be a space between methyl adaman- --.  Column 6, line 2 delete "3".  Column 6, line 5, correct the spelling of "and".  Column 6, lines 12, 13 and 14 should read -- Preparation of N-[2-(N-ethyl-3-methyl-1-adamantylamino)ethyl]-N-methyl-2-ethoxy-2,2-diphenylacetamide, hydrochloride.--.

In the heading to the printed specification, lines 4 to 6, "assignor to Olin Mathieson Chemical Corporation, New York, N. Y., a corporation of Virginia" should read -- assignor, by mesne assignments, to E. R. Squibb & Sons, Inc., New York, N. Y., a corporation of Delaware --.

Signed and sealed this 3rd day of November 1970.

(SEAL)
Attest:

EDWARD M. FLETCHER, JR.
Attesting Officer

WILLIAM E. SCHUYLER, JR.
Commissioner of Patents